United States Patent Office 2,867,311
Patented Jan. 6, 1959

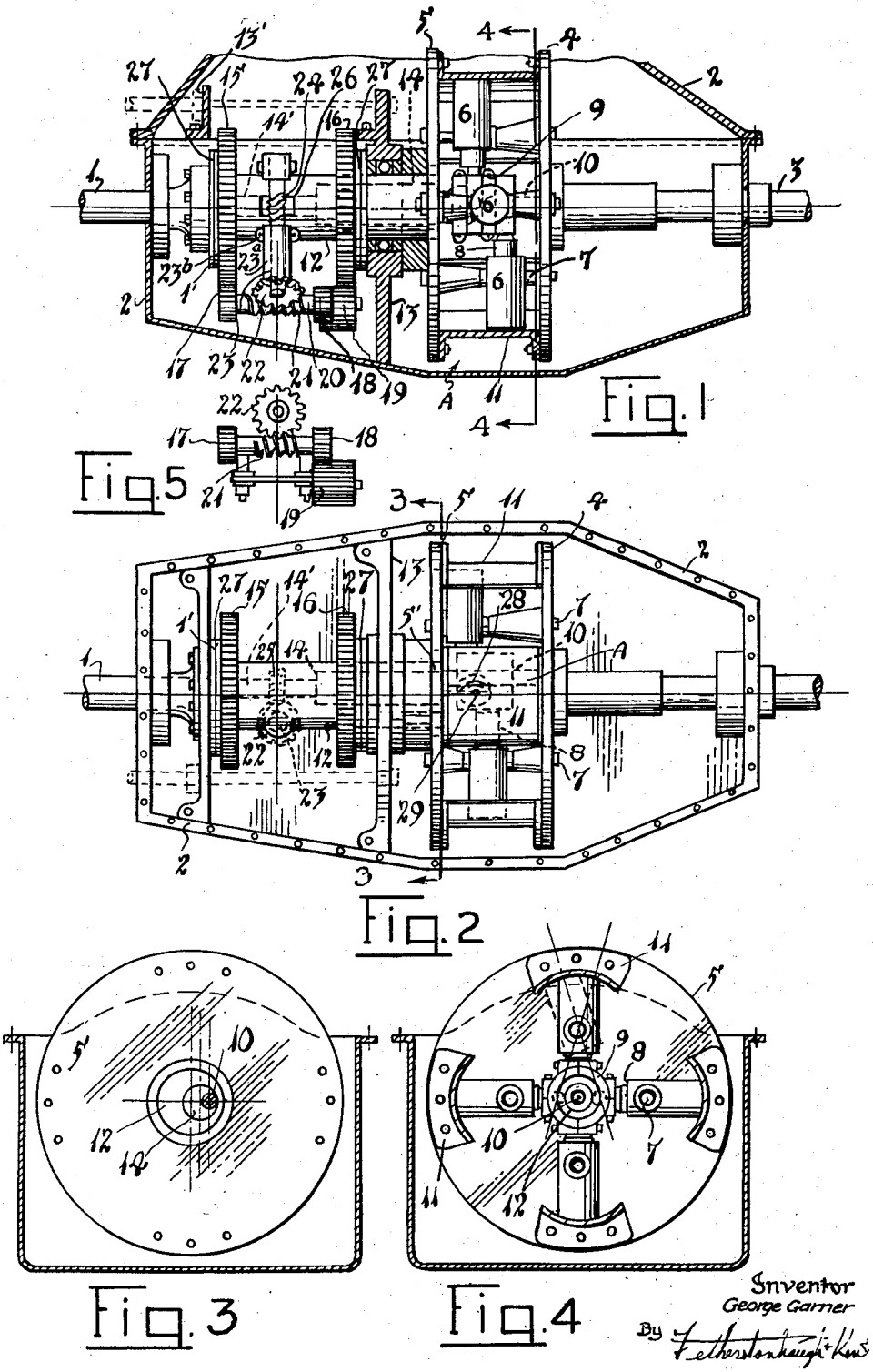

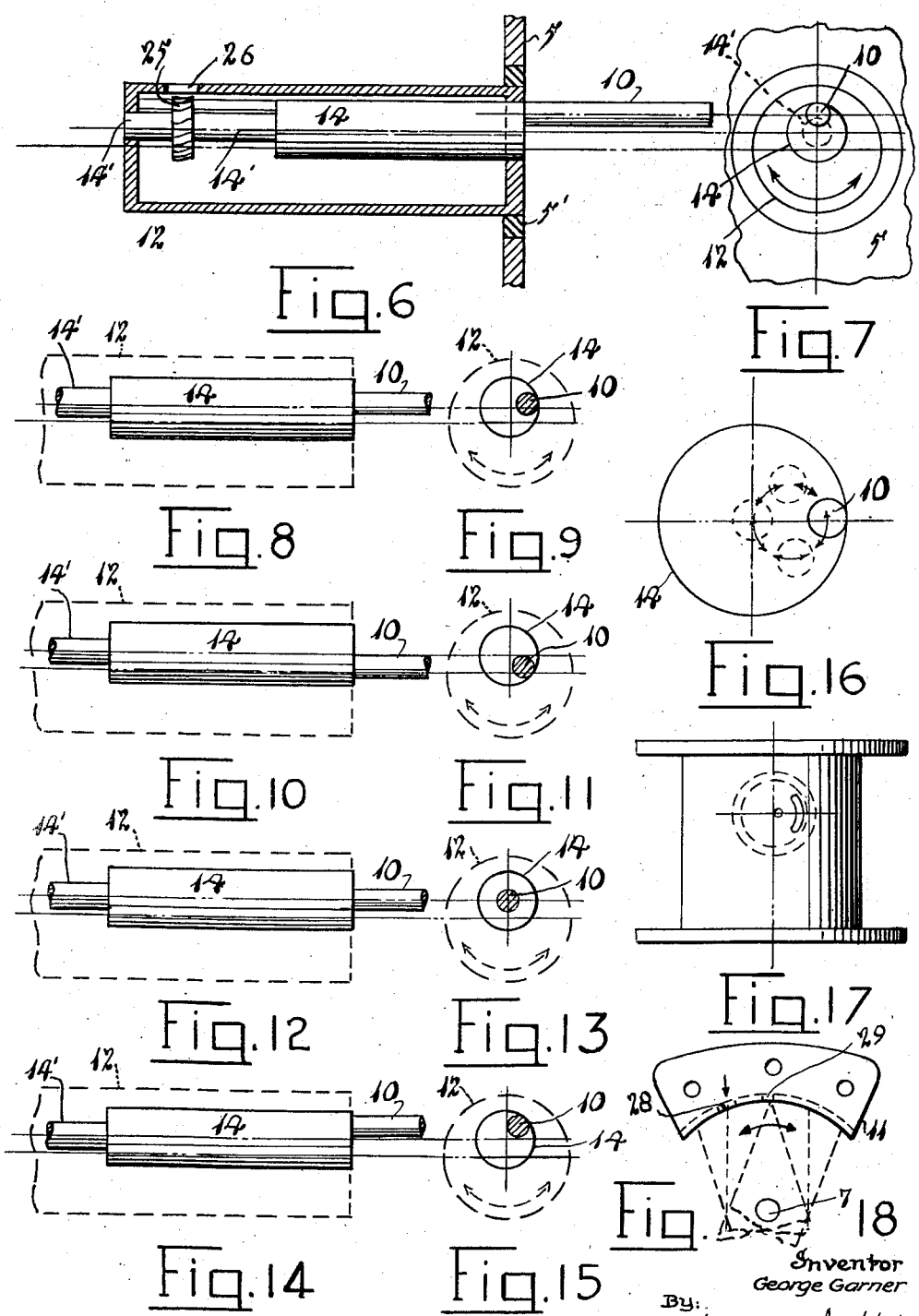

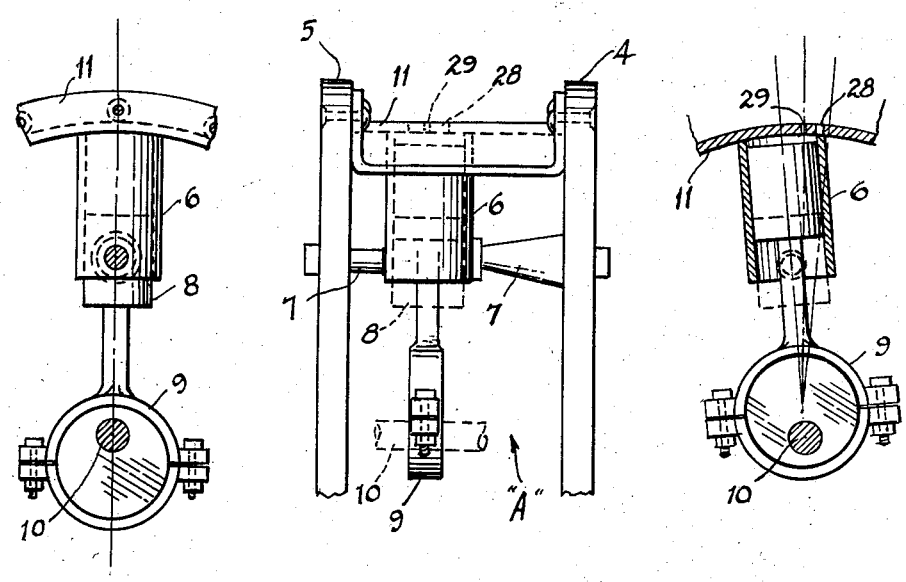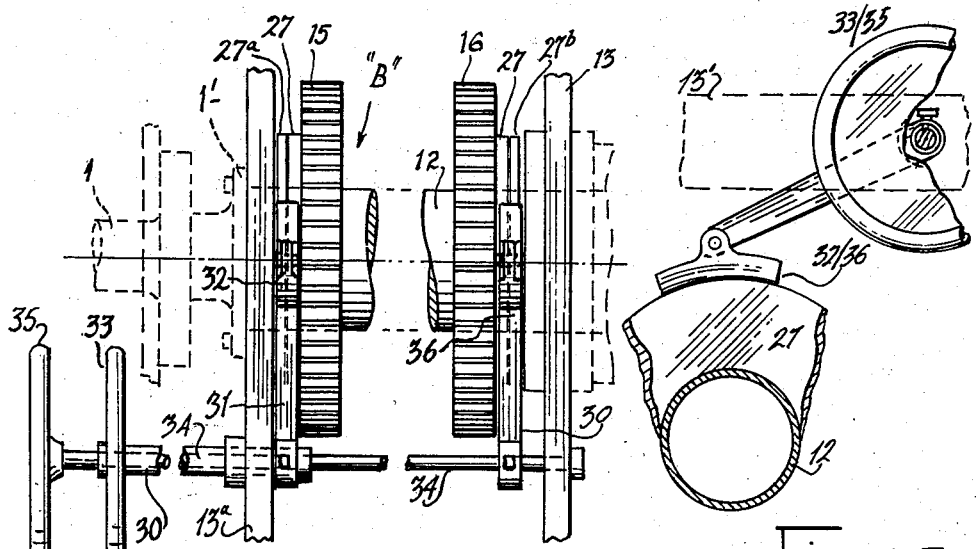

2,867,311

VARIABLE SPEED FLUID TRANSMISSION UNIT

George Garner, Calgary, Alberta, Canada

Application November 4, 1954, Serial No. 466,844

4 Claims. (Cl. 192—60)

My invention relates to new and useful improvements in variable speed fluid transmission units, the principal object and essence of my invention being to provide a transmission unit for automobiles and other types of rotated power transmitters disposed between the driving and driven shaft thereof and, at the same time, eliminating all rotated and slidable gear shifting and substituting a series of rams and cylinders and utilizing compressed oil as a means to drive a shaft element of the unit by compression by the rams from a power driven shaft.

A further object of my invention is to provide a device of the character herewithin described which gives an infinite speed ratio between the driving and driven shafts controllable by the operator.

Yet another object of my invention is to provide a fluid transmission unit of the character herewithin described which is extremely compact and self-contained.

Still another object of my invention is to provide a device of the character herewithin described which is relatively simple in construction, contains relatively few moving parts, and is otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a longitudinal cross-sectional view, partly in full view, without top cover.

Figure 2 is a plan view of the unit with cover removed.

Figure 3 is a sectionalized view through line 3—3 of Figure 2.

Figure 4 is a sectionalized view through line 4—4 of Figure 1, showing neutral position of unit with no crank pin eccentricity.

Figure 5 is a detail view of the change direction and speed control means in part only, with reference to Figure 1.

Figure 6 is a longitudinal cross section of the off-centre shafts within cover sleeve, and the off-centre crank pin.

Figure 7 is an end view of Figure 6.

Figures 8, 10, 12 and 14 show various positions of the crank pin rotatable about the axis of the speed varying shaft as manually rotated for this purpose.

Figures 9, 11, 13 and 15 show end views of the respective longitudinal views in Figures 8, 10, 12 and 14.

Figure 16 is a diagrammatic view of the rotatable crank pin relative with the cover sleeve of Figure 6, showing typically the rotative path of the pin relative thereto, as the means to vary the speed of the driven shaft of the unit.

Figure 17 is a plan view of the ported valve member for cylinder intake and outlet.

Figure 18 is a front view of Figure 17.

Figure 19 is a front view in part of ram, cylinder and trunnion mounting of operative valve.

Figure 20 is an end view of valve face and eccentric in vertical alignment.

Figure 21 is an end view of cylinder in section with valve apertures and cylinder tilted.

Figure 22 is a plan of brake adjusting elements (typical).

Figure 23 is an end view in part of braking system to regulate speed or non-rotation of transmissed R. P. M.

In the drawings like characters of reference indicate corresponding parts in the different figures.

The present device provides a smooth-running silent gearless mechanism free from shock when changing speeds insofar as there is an intermittent speed ratio available between the driving and driven shaft. A single lever is provided to manipulate the speed changes and gives a perfect gradation of speeds from low to high and reverse and down to neutral and stationary. This transmission is self-contained and uses the same hydraulic fluid over and over again with little need of replenishment due to viscosity becoming lean. Furthermore, all working parts of the mechanism are continuously in a bath of this hydraulic fluid which acts as a lubricant also.

Proceeding now to describe my invention in detail, it will be seen that I have illustrated in the accompanying drawings a drive shaft 1 which enters one end of an oil tight overall covering casing 2, and a driven shaft 3 is bearably supported in the opposite end wall of the said casing, both these shafts being in true alignment. The power transmitting elements between these two shafts are generally referred to by "A," and the apparatus for controlling speed changes and reverse and neutral is disposed between the said transmission elements and the applied motive power unit (engine or motor not shown), and this is generally referred to as "B."

The driven end of the unit consists of a disc 4 to which the shaft 3 is concentrically affixed, and a second disc 5 is in spaced relationship with the disc 4, on the side thereof towards the apparatus "B." Between these two discs are mounted a series of cylinders 6 pivoted on trunnions 7, which trunnions are axially concentric about the axis of the discs and the shafts 1 and 3. Rams 8 slidably engage within the cylinders 6, and have their big ends 9 rotatably mounted on a crank pin 10 in variable axial relationship with the shafts 1 and 3, or in true axial relationship therewith as for a neutral position and effect.

The outer end of each cylinder 6 is open, and the surface so curved as to slidably contact a curved valve member 11, one for each cylinder, and bolted to and bridged between the outer periphery of each disc 4 and 5. This valve action is subsequently described.

In order to provide this variable axial relationship between the crank pin 10 and the shafts 1 and 3, the drive shaft 1 is enclosed within and secured to one end of a cover sleeve 12 by flange 1' bearably supported in a transverse bridging member 13 and within a bushing 5' in disc 5. A short shaft 14 is run longitudinally through this cover sleeve and is axially aligned at a definite predetermined distance from and parallel with the shaft 1. On the end of this shaft 14 and towards the disc 4 is affixed the said crank pin 10, which pin mounts the said big ends 9, and is also aligned longitudinally and axially parallel with the drive shaft 1, and is offset an equal amount from the said shaft 14 as the shaft 14 is from the shaft 1. Thus the crank pin axis is offset double the dimension from shaft 1 axis as is the shaft 14 axis in order to provide a full stroke for each ram equal to twice this double dimension as the pin rotates around the imaginary centre line of both shafts 1 and 3. However, it is so mechanically arranged that these two added together dimensions between pin 10 and shaft 1 are variably adjustable by band brake means not operatively described, to provide variations in the offset or crank distance of pin 10 from shaft 1. A midway ram stroke for neutral position occurs when the crank pin 10 axis is in exact alignment with shaft 1.

Any manual dispositioning of the crank pin 10 away from the common axes of shafts 1 and 3 increases the offsetting or eccentricity of the pin therefrom, and consequently varies the length of stroke of each ram in its cylinder to increase the speed delivery to the driven shaft 3 as later explained. A reversed disposition of the pin 10 will decrease the speed of the shaft 3.

The variable positioning of the crank pin 10 is achieved by means of two toothed racks 15 and 16 loosely supported upon the outer face of the cover sleeve 12, with which racks two gears 17 and 18 engage, one rack 15 meshing directly with a directional-influencing gear 17. The other rack 16 is engaged by a third gear 19 mounted within the casing 2. This latter gear meshes with the reversing gear 18 on a shaft 20 which also carries the gear 17. Between gears 17 and 18 is a worm 21 on shaft 20 which on rotation manually turns a worm gear 22 in engagement therewith. Gear 22 terminates on a short shaft 23 axially transverse to the sleeve 12 and secured thereto running in a bearing 23A, said bearing being attached to sleeve 12 by bolts 23B. As and where this shaft 22 crosses the cover sleeve 12 it is wormed at 24 to screwably engage a worm gear 25 shown in phantom in Figure 2 within sleeve 12 mounted on a shaft 14' extending from shaft 14 in concentric alignment therewith, which shaft 14, by manipulation turns the crank pin 10 about the shaft 14 to vary speed by controlling the stroke length of each ram. A slot 26 in cover sleeve 12 allows for the introduction of these meshing gears.

The direction of rotation of the unit portion "B" and shaft 3 is governed by means of brake bands (not shown) being closed alternatively on the brake faces 27 circumventing the sleeve 12, these brake faces being integral with their corresponding racks 15 and 16. This manipulatory means can be varied constructionally to suit, and is of a conventional nature. A single lever is all that is required to control rotation-direction and speed, as well as "neutral" in operating the portion "B" of the unit. It is to be noted that the whole of this unit "B" rotates with the drive shaft 1, the gears 17, 18 and 19 being stationary on their shafts and turning the racks 15 and 16, unless they are stopped by the brake band, at which time of course the motion is transmitted to the relevant gear 17 and 18 thereby actuating the worm wheel 22 and thus altering the position of pin 10. Also each full stroke is four times the initial axis dimensional distance between shaft 1 and shaft 14, or twice that between crank pin 10 axis and axis of shaft 1.

A shaft 30 is mounted, as seen in phantom in Figs. 1 and 2, on a cross member 13' bridging the casing 2, to which shaft is fixedly attached an arm 31. At the free end of this arm is pivoted a brake shoe 32 which frictionally contacts the brake face 27 on turning shaft 30 by means of a hand wheel 33, which brake face is attached to gear 15 as previously mentioned. Facing this brake member 27 is a disc 27a rotatable with the sleeve 12, and consequently with shaft 1, which is also frictionally contactable with the brake shoe 32 as a means of rotating the gear 15 for adjusting of pin 10. This method of braking is duplicated for reversal of shaft 14' as described through gears 17, 18, and 19 (Fig. 5), by means of a shaft 34 bearing within said shaft 30, the end of which shaft is journalled in cross member 13. This shaft 34 is manually rotatable by a wheel 35 outwardly adjacent to wheel 33. An arm 35 with a brake shoe 36, frictionally contacts the brake member 27 attached to gear 16, adjacent to which member 27 is a disc member 27b rotatable with said sleeve 12.

Thus by means of these shoes contact to these sets of braking discs, the rotative adjustment of the associated shaft 14' and the pin 10 is effected.

The casing 2 is filled with oil or other fluid under slight pressure, and the fluid is drawn into each cylinder by its ram as shaft 1 rotates, and through an elongated port 28 in each valve member 11. This quantity of fluid as it is compressed in each cylinder forces the discs 4 and 5 to rotate the shaft 3 attached to the disc 4, the ports being opened and closed in accordance with the movement of its cooperating cylinder as it pivots on its trunnions. A small aperture 29 as compared with the port 28 is disposed adjacent thereto through the valve member 11 which is open to the cylinder at all times. This is necessary to relieve the pressure set up during the compression period, and through which the compressed fluid gradually escapes back into the case 2, and it also maintains a cushioning effect for the fluid. Prior to starting especially the pressurized fluid in the casing will keep the cylinders filled in readiness for compression by the reciprocating rams as they are pushed outwardly within the cylinders against the semiclosed valve members 11 during the period of momentarily closed ports 28. Thus each cylinder oscillating on its trunnions forces the mounting discs 4 and 5 and shaft 3 to rotate through the effect of its contained compressed fluid as power is applied to the drive shaft 1.

The sole object of the rotatable crank pin 10 is for increasing and decreasing the actual length of stroke movement by varying its off-centre dimension from the shaft 14, and by this increasing and decreasing means the rotative effect between rams, cylinders and shaft 3 results, respectively increasing and decreasing the speed of said shaft. It is then obvious that when there is no crank throw with respect to the shafts 1 and 3 there is no rotation transmitted, since the crank pin axis is in alignment with the axes of both these shafts. All of which gradation from neutral to maximum speed and reversely has been under manual control as previously and hereafter set forth by description.

In defining the operation of transmitting the power from the drive to the driven shafts, the fluid is drawn into the cylinders 6 as the drive shaft 1 is rotated and from a minimum stroke to a maximum stroke, according to the amount of eccentricity of the pin 10 about the axis of the shaft 14, as regulated by manipulated friction on the brake drums 27 for more or less speed. Each cylinder head is closed by one of the valves 11 as the cylinder swings or oscillates on its trunnion by virtue of the pin movement and each associated big end 9 circling around the axis of shaft 1. This results in fluid compression in each cylinder in a consecutive cycle around this shaft due to the travel of the ram in each cylinder, thus transmitting rotary motion to the driven discs 4 and 5. This driving effect is due to the resistance caused by compressing the fluid in each cylinder against the valve plate between it and the pin 10. Consequently, compressed fluid strikes this valve face adjacent each cylinder head as the cylinder oscillates from side to side to transmit power from crank pin 10 to the cylinder head outwardly and via the fluid in each cylinder when the valve port is closed. Since something has to "give" the trunnions mounted on discs 4 and 5 must rotate the discs around the main shaft on account of the offset of pin 10 therefrom.

There is no rotation transmitted from shaft 1 to shaft 3 when there is no offset of pin 10 therefrom, and so shaft 1 is then idling as in Figure 4. As soon as the R. P. M. in both shafts 1 and 3 synchronize at any required speed then there is no displacement of fluid at all in the cylinders, and rotation continues steadily until pin 10 is offset to regulate the speed in shaft 3.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A variable speed fluid transmission unit comprising in combination an enclosing oil filled casing and cover therefor, a driving shaft journalled for rotation in one end of said casing, a driven shaft journalled for rotation in the other end of said casing and in axial alignment with said driving shaft, a disc concentrically secured to the inner end of said driven shaft, a further disc spaced and parallel from said first mentioned disc, a plurality of curved valve members spanning the periphery of said disc thereby maintaining same in said spaced and parallel relationship, a crank pin operatively connected to said driving shaft and extending between said discs parallel to the axes thereof, means for increasing and decreasing the distance between the axis of said crank pin and the axis of said driving and driven shaft, thus imparting eccentricity to said crank pin, a plurality of open-ended cylinders trunnioned for rocking motion between said discs and adjacent at their head ends one each of said curved value members, a ram for each of said cylinders, a big-end of each of said rams concentrically connected to said crank pin, ports in each of said valve members, said eccentricity of said crank pin varying the length of stroke of each said ram, and thus the power is transmitted to said discs via said ram and cylinder combination and via said curved valve members, and pressurized hydraulic fluid substantially filling said casing.

2. The device according to claim 1 which includes a cover sleeve secured by one end thereof to the inner end of said driving shaft, the opposite end of said sleeve being bearably supported concentrically within said second-mentioned disc, a shaft journalled for rotation between the ends of said sleeve, the longitudinal axis of said shaft being spaced from and parallel to the longitudinal axis of said cover sleeve, said crank pin extending from one end of said last-mentioned shaft, said crank pin being offset from the longitudinal axis of said shaft, but parallel thereto, by an amount equal to the amount by which the longitudinal axis of said last-mentioned shaft is offset from the longitudinal axis of said cover sleeve, whereby rotation of said shaft is adapted to align said crank pin longitudinal axis with said cover sleeve longitudinal axis as a minimum position, or to position said crank pin longitudinal axis an amount equal to twice the distance between the cover sleeve axis and the drive sleeve axis as a maximum, and to position between said minimum and maximum positions.

3. The device according to claim 2 in which said means to increase or decrease the distance between the axis of said crank pin and the common axis of said driving and driven shafts includes a pair of racks encircling said cover sleeve one adjacent each end thereof, said racks being freely supported for rotation upon said cover sleeve, a brake drum integral with each of said racks, a gear in engagement with each of said racks, a shaft to support one of said gears for rotation, a further gear engaging said last-mentioned gear, a common shaft to which are secured said last-mentioned gear and the other of said rack engaging gears, a worm on said last-mentioned shaft, a worm gear engaging said worm at right angles thereto, a shaft for said worm gear supported transversely across the outer surface of said cover sleeve and between said racks, a worm on said shaft, and a further worm gear on the said shaft within said cover sleeve engageable with said last-mentioned worm through an aperture in said cover sleeve, said brake drums adapted to selectively prevent the rotation of said racks, thereby transmitting reversible rotation to said shaft within said cover sleeve for varying the axis eccentricity of said crank pin relative to the axis of said drive and driven shafts and for registering the coincidence of same therewith, said gears rolling on said racks when racks are stationary for said axis eccentric variation, and said gears and shafts rotating with said cover sleeve when said driven shaft is being rotated.

4. The device according to claim 1 which includes, besides said ports, a pressure relief aperture in each valve member for communication between each said cylinder and said casing at all times.

References Cited in the file of this patent

UNITED STATES PATENTS

| | | |
|---|---|---|
| 1,372,985 | Sundh | Mar. 29, 1921 |
| 1,833,977 | Saller | Dec. 1, 1931 |

FOREIGN PATENTS

| | | |
|---|---|---|
| 15,989 | France | Oct. 26, 1912 |